United States Patent [19]

Allan et al.

[11] 4,028,774

[45] June 14, 1977

[54] METHOD OF AND APPARATUS FOR CARCASS COOLING

[75] Inventors: John H. Allan; Jerrold L. Ball; Charles B. Dull; Leo A. Gabriel, all of Stockton; Richard E. Curtis, Foster City; Victor J. Dervin, Cupertino, all of Calif.

[73] Assignees: James Allan & Sons, Inc., Stockton; NPI Corporation, Burlingame, both of Calif. ; part interest to each

[22] Filed: July 2, 1976

[21] Appl. No.: 702,353

Related U.S. Application Data

[63] Continuation of Ser. No. 545,138, Jan. 29, 1975, abandoned.

[52] U.S. Cl. .................................... 17/24; 17/45; 99/475; 426/418; 426/524
[51] Int. Cl.² ......................................... A22B 5/00
[58] Field of Search ............... 17/45, 24, 1 R, 1 A, 17/51, 44; 426/524, 418; 99/475, 474, 467, 477; 104/106, 111; 198/177 R, 177 T

[56] References Cited

UNITED STATES PATENTS

| 767,921 | 8/1904 | Beale | 99/475 |
| 1,837,514 | 12/1931 | Agar | 17/45 |
| 2,419,119 | 4/1947 | Christensen | 426/524 |
| 2,489,918 | 11/1949 | Menges | 426/418 |
| 2,705,678 | 4/1955 | Morrison | 426/524 |

FOREIGN PATENTS OR APPLICATIONS 524,099 11/1953 Belgium ............................ 99/475

Primary Examiner—Louis G. Mancene
Assistant Examiner—Robert F. Cutting
Attorney, Agent, or Firm—Lothrop & West

[57] ABSTRACT

An enclosure is divided by partitions to define a narrow sinuous passageway for the passage of carcasses from an inlet to an outlet. The sinuous passageway defines adjacent aisle portions and a blower directs refrigerated air downwardly over the carcasses in one of the aisle portions. The air passes under the dividing partition into the adjacent aisle portion and the blower draws it upwardly over the carcasses in that adjacent aisle portion to rapidly freeze a crust on the carcasses during their passage from the inlet to the outlet. The method of the invention is the blowing of cold air over a carcass in one vertical direction then over the same carcass in the opposite vertical direction.

11 Claims, 2 Drawing Figures

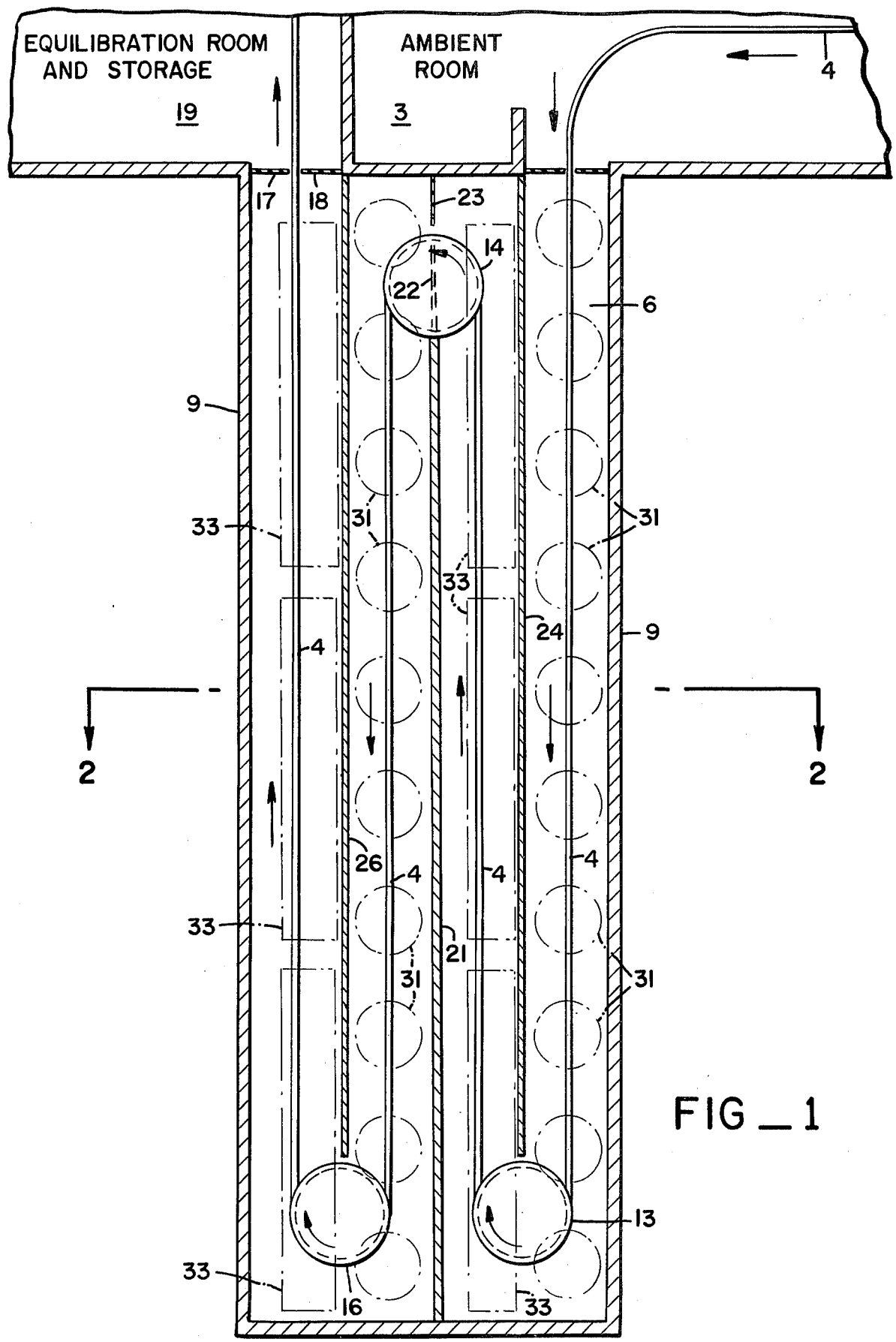
FIG_1

U.S. Patent  June 14, 1977  Sheet 2 of 2  4,028,774
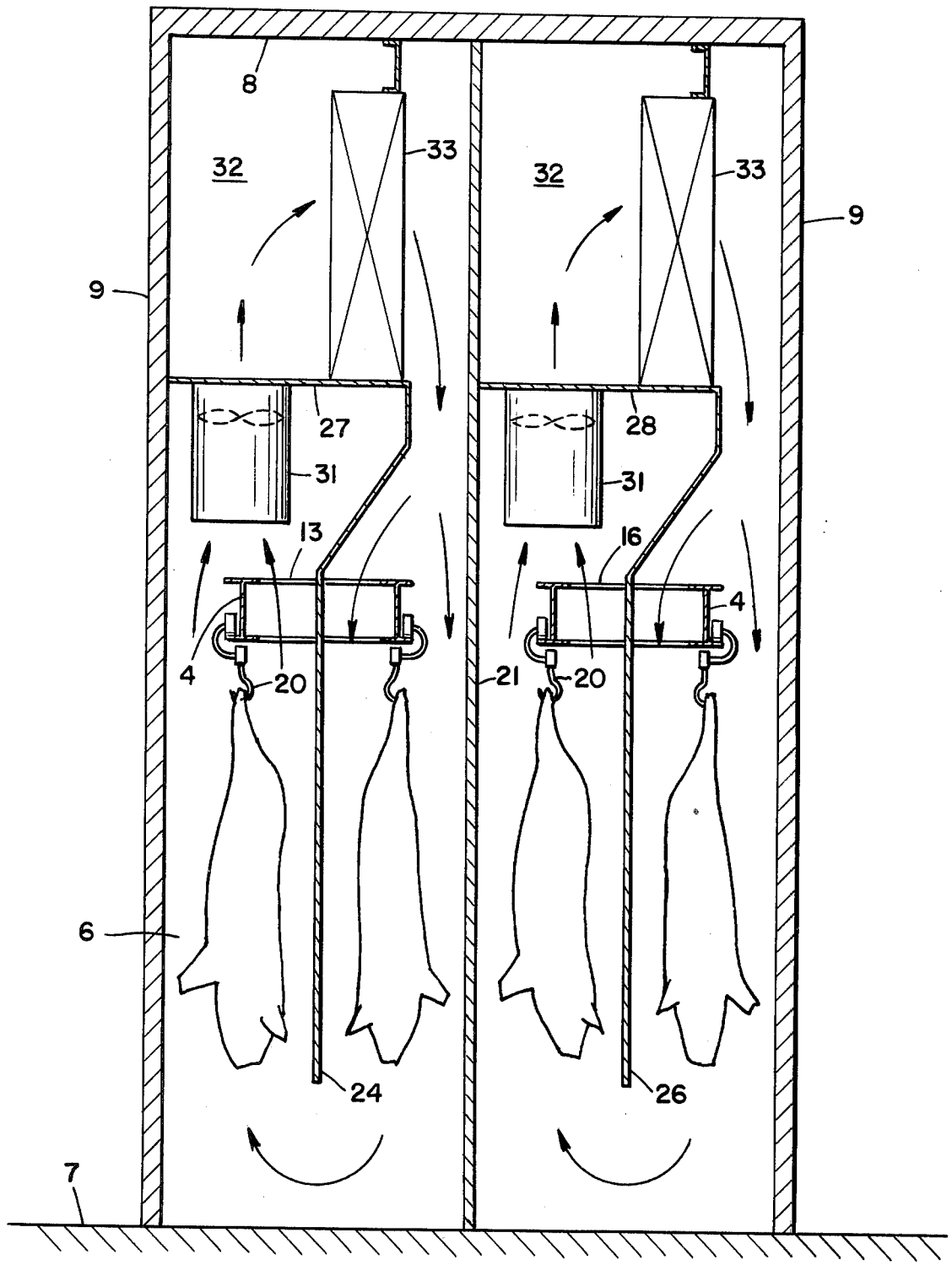
FIG_2

METHOD OF AND APPARATUS FOR CARCASS COOLING

This is a continuation of application Ser. No. 545,138, filed Jan. 29, 1975, now abandoned.

BACKGROUND OF THE INVENTION

This invention is in the field of means and methods for surface freezing carcasses.

There are presently difficulties in the usual, commercial handling of carcasses of this sort. One of the customary steps includes hanging the carcasses for a period in a chill room, or the like, within which the temperature is maintained at a relatively low value. Storage of the carcasses with body heat initially therein in the chill room results in a loss of moisture from the carcasses. This is a serious loss of sales weight. It is sometimes productive of carcass shrinkage to an extent producing distortion and an unattractive appearance. According to some methods of butchering the animal backbone is split and opened to expose the severed surfaces. If left in the carcass, which is usual, these may take on a dark or blackened hue which is quite unattractive to the purchaser. In addition, the loss of relatively warm carcass moisture tends to produce a corresponding condensation of the moisture on the ceiling and walls of the chill room. The accumulated condensate drips back onto the carcasses. This is an unsanitary and undesirable occurrence because any bacteria or contaminants on the ceiling or walls tend to deposit on the carcasses and to initiate extra deterioration therein. In fact, such conditions are frowned upon but necessarily tolerated by the official inspectors.

The carcasses usually have to be hung at a substantial distance from each other so that they do not actually touch, for at the touching areas under many conditions there is initiated deterioration in the meat.

SUMMARY OF THE INVENTION

It is therefore an object of the invention to provide a system of handling carcasses with body heat therein which will condition or prepare such carcasses for ultimate chill room hanging and which will maintain substantially all of the moisture within the carcass and prevent the moisture from evaporating and then depositing elsewhere.

Another object of the invention is to provide a way for handling carcasses containing split and exposed backbone portions so that there is no noticeable or deleterious bone blackening.

A further object of the invention is to provide a method of and apparatus for carcass cooling in which the carcasses can be handled in very close, even touching proximity to each other without any serious disadvantages.

A further object of the invention is to provide a method of and apparatus for carcass cooling that can readily be applied or adapted to carcass handling equipment and plants already in existence.

A further object of the invention is to provide a method of and apparatus for carcass cooling that is economical of energy and is expeditious and effective in produing the desired result.

A further object of the invention is in general to provide an improved method of and apparatus for carcass cooling.

Other objects of the invention together with the foregoing are attained in the embodiment of the invention described in the accompanying description and illustrated in the accompanying drawings, in which:

BRIEF DESCRIPTION OF THE DRAWINGS

FIG. 1 is a plan of one portion of an apparatus for use in carcass cooling pursuant to the invention, the view being a section on a horizontal plane substantially above the floor of a serpentine cooling or crust freezing tunnel; and FIG. 2 is a cross-section, the plane of which is indicated by the line 2—2 of FIG. 1.

DESCRIPTION OF A PREFERRED EMBODIMENT

While the method and apparatus can easily be adapted to various different installations depending upon the plant layout, items to be handled, and the like, it is described herein in a practical, successful form used in connection with the handling of carcasses of three species, beef, hogs and sheep. The description is intended to apply to the handling of any one or the other or all of such species, since the requirements do not substantially differ.

In a typical installation there is already available or there is particularly provided a room 3 normally operated at ordinary atmospheric or building ambient temperature and serving as a room housing the carcasses to be treated. In such room the carcasses retain much of their original body heat over a long time and are not therein specially treated except that they are moved along expeditiously in the process. The ambient room 3 has an overhead conveyor rail 4 illustrating any suitable sort of conveying mechanism from which the carcasses are hung and which leads from the ambient room into a special crust freezing tunnel or chill tunnel 6. This is a compactly arranged enclosure having a floor 7, a ceiling 8 and having walls 9, for example. In order to achieve a compact arrangement, the tunnel 6 is situated so that the conveyor 4 extends into it at an entrance near one corner, passing through or between a pair of flexible door flaps 11 and 12; for example, of relatively heavy, rubber sheeting.

The conveyor 4 extends longitudinally along a side aisle of the tunnel 6 and eventually rounds a turning mechanism 13 thus reversing its direction and traveling in a central aisle along an adjacent, parallel path. The conveyor continues around another turning mechanism 14 at the initial end of the tunnel and repeats a traverse by extending in another central aisle parallel to the first path. The conveyor then goes around a final turning mechanism 16 and thence in a parallel side aisle in a final path through an exit having another pair of flexible flap doors 17 and 18 into an equilibration or storage room 19 of a relatively standard arrangement.

The conveyor 4 is of any suitable sort and preferably includes at set intervals in its length means for appropriately suspending and advancing the individual carcasses being handled. For example, the conveyor 4 includes a chain having hooks 20 secured to the links thereof at set distances, say, each 1 foot apart or each 1 foot and 3 inches apart or the like. The hooks 20 are disposed at a height above the floor 7 so that the carcasses can readily be suspended therefrom with the carcasses clearing the floor by an adequate amount, say, a foot or 2 feet.

With this conveying arrangement, the size of the room 6 is arranged with a sinuous passageway. It is subdivided into the several paths of the conveyor and so that the vertically depending carcasses on the hooks travel through the room quite close to walls on both sides. Closely to confine the carcasses, the tunnel 6 is partly defined by a central wall 21 extending from the floor 7 to the ceiling 8 and merging with the room wall 9 at one end. At the other end, the central wall 21 terminates in a pair of flexible flaps 22 and 23. These substantially seal off passage therethrough except when they are displaced mechanically by carcasses passing between them under the advancing effort of the conveyor.

Augmenting the center wall 21 are intervening partition walls 24 and 26 parallel to the side walls and center wall of the tunnel. The partition walls extend upwardly to maintain the division between individual aisles and at a high level merge with substantially horizontal baffle walls 27 and 28 disposed in the upper portion of the room. The adjacent pairs of paths or aisles are substantially separated from each other except at the bottom and are divided from each other except near the ends.

To maintain desired and appropriate ambient conditions within the chill tunnel and particularly to do so effectively and economically, it is arranged that the width of the individual aisles or passageways is only slightly more than the width of the carcasses to be handled therein. While the beef carcasses may come very close to the walls and the hog and sheep carcasses may clear the walls by an additional amount, there is nevertheless a relatively close confinement by the walls and only a little space between successive carcasses.

The atmosphere in the tunnel 6 is specially constituted. Normal atmospheric air is utilized but is forcibly circulated by means of a number of blower fans 31 arranged generally in a longitudinal array with their shroud axes vertical and disposed just above one of the paths of the conveyor 4. The air within the chamber is drawn upwardly by each fan 31 and is blown vertically into an associated one of two plenum chambers 32. The air then passes through one of a pair of heat exchange units 33 or air coolers preferably comprised of appropriate coils carrying a circulating refrigerant. The air in passing over the coils of the heat exchanger 33 has much of its heat extracted and then is discharged in a much cooled condition to travel downwardly in the next adjacent aisle or passageway. The air is continuously circulated and recirculated in this fashion over the carcasses in a generally vertically upward direction in one aisle and then in a generally vertically downward direction in the next aisle, the circulation direction alternating between vertically up and vertically down as the carcasses traverse the tunnel 6. Furthermore, the action of the fans 31 produces a very high air velocity so there is in fact a forcible cold air blast rather than a mild air circulation over the suspended carcasses.

As an example, the refrigerant circulating in the heat exchanger 33 is maintained usually within a temperature range between about −45° Fahrenheit and −40° Fahrenheit. The temperature of the circulating air is readily maintained within a range between about −30° Fahrenheit and −10° Fahrenheit. The regulation of the temperature is at any selected value within the range and in practice varies only a small amounnt from the set point. It is arranged that the air velocity vertically in each of the aisles or passages in the loaded chill tunnel is between 400 to 600 feet per minute. This is accomplished without excessive heating from the electric motors for the fans 31 by having the heat exchangers 33 somewhat open in construction. In operation of the mechanism, the carcasses are spaced quite closely together; for example, on conveyor hooks that are from 10 inches to 14 or 15 inches apart and in entering the tunnel 6 deflect the flexible gates 11 and 12 to confine air to the chill tunnel as nearly as possible. The carcasses advance either continuously or in a repeated step-by-step motion. The speed of advance is such that each carcass enters, passes through the chill tunnel and then exits therefrom in from about 15 to 45 minutes. A satisfactory dwell time in commercial production with a hog carcass is about nineteen minutes. The total traverse length of the conveyor in a typical commercial chill tunnel is 164 feet, each aisle or passageway being some 41 feet long. The amount of refrigeration for each path or aisle of the chill tunnel is about 30 tons, about 0.73 tons of refrigerant per foot of conveyor length in the chill tunnel.

It has been observed that as a carcass travels through the chill tunnel under the mentioned conditions its outside surface is very rapidly brought to a very low temperature, a temperature way below freezing and effective to close off to a small depth or seal the outside of the carcass and in effect or to the touch forming what is termed a "crust" thereon. Hence, the system is referred to as a crust freezing system employing a chill tunnel. The effect of the crust freezing is to provide a very low gradient for moisture dissipation from the carcass. The major amount of the moisture normally present in the carcass is retained therein. The weight of the carcass is maintained with very slight moisture loss. The shrinkage is at a very low value; for example, near 1 percent by weight as opposed to 3 percent or so when crust freezing is not used. The outside surface of the carcass remains relatively dry and free of any substantial amount of frost. There is no apparent distortion.

Following the advance of the carcasses through the chill tunnel they are discharged on the conveyor through the doors 17 and 18 into the equilibration room 19 wherein they are usually shunted to spare conveyors and are hung motionless for holding and for temperature equilization. With the crust freezing process the carcasses can be left in immediate touch or contact with each other, since they do not deteriorate at touch points. Since they are and remain relatively dry they do not dissipate substantial moisture or "steam" for condensation on the room ceiling and walls. The equilibration room 19 is substantially free of moisture that can drip or fall back onto the carcasses.

It has further been observed that when the carcasses contain split and exposed backbones the treatment of the carcasses in the tunnel at the indicated temperatures and manner and time does not produce any noticeable bone blackening even several days after the process has been completed.

Upon occasion and at the end of a run or whenever it is desired to clean the chill tunnel, the conveyors are stopped or are continued through the tunnel but without any carcasses thereon and the room is substantially emptied of carcasses. Thereupon the refrigerant in the coils 33 is interrupted and a warm heat transfer liquid is pumped therethrough. The fans are again operated and the chill tunnel is brought up to normal or even above-normal ambient temperature. Cleaners can then enter the chill tunnel and with hoses and the like wash down and clean the ceiling, walls, and flush the floor thereof rendering the chill tunnel entirely sanitary for a subsequent operation.

It has also been observed that the carcasses treated in accordance with the disclosed system appear to have a better transfer of their retained internal body heat to the outside surface than is the case when the carcass is in a higher temperature room with a relatively slow air flow. The net result has been the production of an increased carcass weight for delivery as distinguished from prior or standard practice, a carcass that is in no wise deleteriously affected by contact with other carcasses, a carcass in which there is but little shrinkage and a carcass surface generally free of bacteria or soil which might otherwise have been deposited thereon.

It is easy to shift the operation of the mechanism from beef to sheep and hogs indiscriminately since any one of the species can pass through the tunnel as described, there being adequate clearance for beef and more than that for the smaller species but without much variation in the air velocity or air temperature or the speed of advance of the conveyor. It is possible to adjust the center-to-center distance of the hooks on the conveyor if desired for smaller animals but in many cases a standard spacing can be generally utilized.

In general, therefore, the apparatus and method according to the present disclosure have been successfully practiced in a commercial form and result in a generally improved product with reasonable or even economical costs.

What is claimed is:

1. A device for cooling animal carcasses comprising an enclosure having an entrance and an exit, means including side walls, a floor and a partition wall dividing said enclosure into a horizontally sinuous passageway having at least a pair of adjacent aisles each of a width only slightly more than the width of one of said carcasses, said passageway opening at one end to said entrance and at the other end to said exit, means for vertically suspending and advancing animal carcasses through said passageway from said entrance to said exit, said carcasses advancing along first one of said aisles and then along the other of said aisles, a source of cooling air, a blower for blowing said cooling air downwardly in one of said aisles over carcasses hanging therein and for then drawing said cooling air upwardly in the other of said aisles over carcasses therein, the bottom of said partition wall being spaced upwardly from said floor to provide a path for flow of said air from said one aisle to said other aisle.

2. A device as in claim 1 in which said source of cooling air is an air cooler disposed above said passageway, and means for directing air from said blower through said cooling means then to said one aisle.

3. A process of treating an animal carcass comprising vertically suspending an at least partially dressed carcass containing body heat and exposed to the air, subjecting said suspended carcass to a vertically moving blast of cold air moving first in one direction and then subjecting said carcass to a vertically moving blast of cold air moving in the opposite direction for a total period of from 15 to 20 minutes, said air blast traveling at a velocity of about 500 feet per minute and being at a temperature between −30° F and −10° F.

4. A process for cooling animal carcasses with body heat therein comprising suspending a carcass in air with the spine thereof substantially vertical, blowing a current of relatively cold air over said suspended carcass in one substantially vertical direction, and thereafter blowing a current of relatively cold air over said suspended carcass in the opposite substantially vertical direction.

5. A process as in claim 4 in which said blowing steps continue for about fifteen to forty-five minutes with said relatively cold air at a temperature about from −30° F to −10° F.

6. A process as in claim 4 in which said blowing steps continue about 19 minutes.

7. A process as in claim 4 in which said relatively cold air is at a temperature about −20° F.

8. A process as in claim 4 in which said current of cold air has a velocity of about 400 to 600 feet per minute.

9. A process as in claim 4 in which said current of cold air has a velocity of about 500 feet per minute.

10. A process of treating an animal carcass comprising vertically suspending an at least partially dressed carcass containing body heat and exposed to the air, subjecting said suspended carcass to a vertically moving air blast moving first in one direction and then in the opposite direction for a total period of from 15 to 20 minutes, said air blast traveling at a velocity of about 500 feet per minute and being at a temperature between −30° F and −10° F.

11. A process as in claim 10 including taking said carcass out of said air blast at the end of said period and then immediately retaining said carcass in substantially still air at a temperature of about 30° F.

* * * * *